United States Patent
Shah et al.

(10) Patent No.: US 12,524,069 B2
(45) Date of Patent: Jan. 13, 2026

(54) TECHNIQUES FOR MOTION COMPENSATION

(71) Applicant: Apple Inc., Cupertino, CA (US)

(72) Inventors: Ronak J. Shah, Sunnyvale, CA (US); Walter Rosinger, Los Altos, CA (US); Korbinian B. Scheck, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/896,196

(22) Filed: Sep. 25, 2024

(65) Prior Publication Data

US 2025/0110549 A1    Apr. 3, 2025

Related U.S. Application Data

(60) Provisional application No. 63/541,807, filed on Sep. 30, 2023.

(51) Int. Cl.
*G06F 3/01* (2006.01)
*G06T 11/00* (2006.01)

(52) U.S. Cl.
CPC .............. *G06F 3/012* (2013.01); *G06T 11/00* (2013.01); *G06T 2200/24* (2013.01); *G06T 2210/62* (2013.01)

(58) Field of Classification Search
None
See application file for complete search history.

(56) References Cited

U.S. PATENT DOCUMENTS

| | | |
|---|---|---|
| 2012/0320080 A1* | 12/2012 | Giese ............... G06F 3/011 345/619 |
| 2015/0279102 A1 | 10/2015 | Fleck et al. |
| 2016/0018887 A1* | 1/2016 | Tsukahara ............ G06F 3/012 345/8 |
| 2016/0335739 A1 | 11/2016 | Abraham et al. |
| 2018/0184014 A1 | 6/2018 | Goldstein |
| 2020/0017026 A1 | 1/2020 | Kumar et al. |
| 2022/0066541 A1* | 3/2022 | Basile, Jr. ............ A61B 5/4561 |
| 2023/0071037 A1 | 3/2023 | Kim et al. |
| 2023/0219419 A1 | 7/2023 | Kim |
| 2023/0259328 A1 | 8/2023 | Umezawa et al. |
| 2025/0113068 A1 | 4/2025 | Meyers |

FOREIGN PATENT DOCUMENTS

| | | |
|---|---|---|
| GB | 2557996 A | 7/2018 |
| WO | 2023/060048 A1 | 4/2023 |

OTHER PUBLICATIONS

International Search Report and Written Opinion received for PCT Patent Application No. PCT/US2024/049099, mailed on Nov. 18, 2024, 13 pages.
International Search Report and Written Opinion received for PCT Patent Application No. PCT/US2024/049102, mailed on Jan. 3, 2025, 13 pages.

* cited by examiner

*Primary Examiner* — Ifedayo B Iluyomade
(74) *Attorney, Agent, or Firm* — YHE Law LLP

(57) ABSTRACT

The present disclosure generally relates to techniques for compensating for motion while using a computer system.

39 Claims, 5 Drawing Sheets

TECHNIQUES FOR MOTION COMPENSATION

CROSS-REFERENCE TO RELATED APPLICATIONS

This application claims priority to U.S. Patent Application No. 63/541,807, entitled "TECHNIQUES FOR MOTION COMPENSATION," filed Sep. 30, 2023, the entire contents of which are hereby incorporated by reference.

FIELD

The present disclosure relates generally to techniques for compensating for motion while using a computer system.

BACKGROUND

Electronic devices include displays for displaying content. Electronic devices can be used while in a moving platform such as a car, bus, or other movable vehicle.

SUMMARY

Some techniques for compensating for motion using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for compensating for motion. Such methods and interfaces optionally complement or replace other methods for compensating for motion. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: displaying, via a display component of a computer system, a user interface that includes first content displayed at a first position on the display component; detecting movement of a head of a user relative to the computer system; and in response to detecting the movement of the head of the user relative to the computer system, displaying the first content at a second position on the display component, wherein the second position is different from the first position.

In accordance with some embodiments, a non-transitory computer-readable storage medium is described. The non-transitory computer-readable storage medium stores one or more programs configured to be executed by one or more processors of a computer system. The one or more programs include instructions for: displaying, via a display component of the computer system, a user interface that includes first content displayed at a first position on the display component; detecting movement of a head of a user relative to the computer system; and in response to detecting the movement of the head of the user relative to the computer system, displaying the first content at a second position on the display component, wherein the second position is different from the first position.

In accordance with some embodiments, a transitory computer-readable storage medium is described. The transitory computer-readable storage medium stores one or more programs configured to be executed by one or more processors of a computer system. The one or more programs include instructions for: displaying, via a display component of the computer system, a user interface that includes first content displayed at a first position on the display component; detecting movement of a head of a user relative to the computer system; and in response to detecting the movement of the head of the user relative to the computer system, displaying the first content at a second position on the display component, wherein the second position is different from the first position.

In accordance with some embodiments, a computer system is described. The computer system comprises one or more processors and memory storing one or more programs configured to be executed by the one or more processors. The one or more programs include instructions for: displaying, via a display component of the computer system, a user interface that includes first content displayed at a first position on the display component; detecting movement of a head of a user relative to the computer system; and in response to detecting the movement of the head of the user relative to the computer system, displaying the first content at a second position on the display component, wherein the second position is different from the first position.

In accordance with some embodiments, a computer system is described. The computer system comprises: means for displaying, via a display component of the computer system, a user interface that includes first content displayed at a first position on the display component; means for detecting movement of a head of a user relative to the computer system; and means for, in response to detecting the movement of the head of the user relative to the computer system, displaying the first content at a second position on the display component, wherein the second position is different from the first position.

In accordance with some embodiments, a computer program product is described. The computer program product comprises one or more programs configured to be executed by one or more processors of a computer system. The one or more programs include instructions for: displaying, via a display component of the computer system, a user interface that includes first content displayed at a first position on the display component; detecting movement of a head of a user relative to the computer system; and in response to detecting the movement of the head of the user relative to the computer system, displaying the first content at a second position on the display component, wherein the second position is different from the first position.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for compensating for motion, thereby increasing the effectiveness, efficiency, and user satisfaction with such devices. Such methods and interfaces may complement or replace other methods for compensating for motion.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary techniques for compensating for motion. This description is not intended to limit the scope of this disclosure but is instead provided as a description of example implementations.

Users need electronic devices that provide effective techniques for compensating for motion. This reduction in mental load can enhance user productivity and make the device easier to use. In some embodiments, the techniques described herein can reduce battery usage and processing time (e.g., by providing user interfaces that require fewer user inputs to operate).

Figure 1:
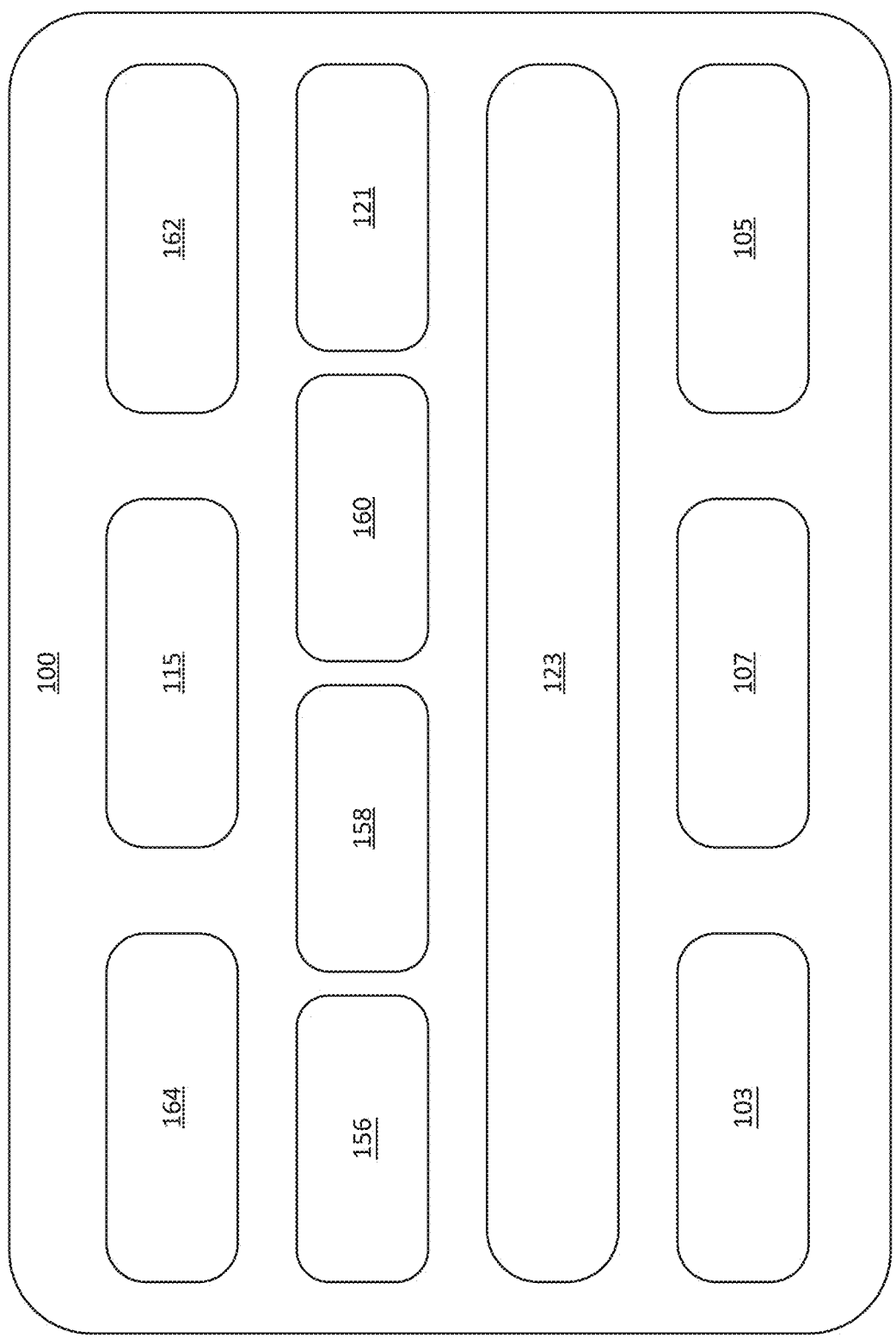
FIG. 1 is a block diagram illustrating a system with various components in accordance with some embodiments.

FIG. 1 provides illustrations of exemplary devices for performing techniques for managing event notifications. FIGS. 2A-2E illustrate exemplary user interfaces for compensating for motion in accordance with some embodiments. FIG. 3 is a flow diagram illustrating methods of compensating for motion in accordance with some embodiments. The user interfaces in FIGS. 2A-2E are used to illustrate the processes described below, including the processes in FIG. 3.

The processes below describe various techniques for making user interfaces and/or human-computer interactions more efficient (e.g., by helping the user to quickly and easily provide inputs and preventing user mistakes when operating a device). These techniques sometimes reduce the number of inputs needed for a user (e.g., a person and/or a user) to perform an operation, provide clear and/or meaningful feedback (e.g., visual, acoustic, and/or haptic feedback) to the user so that the user knows what has happened or what to expect, provide additional information and controls without cluttering the user interface, and/or perform certain operations without requiring further input from the user. Since the user can use a device more quickly and easily, these techniques sometimes improve battery life and/or reduce power usage of the device.

In methods described where one or more steps are contingent on one or more conditions having been satisfied, it should be understood that the described method can be repeated in multiple repetitions so that over the course of the repetitions all of the conditions upon which steps in the method are contingent have been satisfied in different repetitions of the method. For example, if a method requires performing a first step if a condition is satisfied, and a second step if the condition is not satisfied, it should be appreciated that the steps are repeated until the condition has been both satisfied and not satisfied, in no particular order. Thus, a method described with one or more steps that are contingent upon one or more conditions having been satisfied could be rewritten as a method that is repeated until each of the conditions described in the method has been satisfied. This multiple repetition, however, is not required of system or computer readable medium claims where the system or computer readable medium contains instructions for performing conditional operations that require that one or more conditions be satisfied before the operations occur. A person having ordinary skill in the art would also understand that, similar to a method with conditional steps, a system or computer readable storage medium can repeat the steps of a method as many times as are needed to ensure that all of the conditional steps have been performed.

The terminology used in the description of the various embodiments is for the purpose of describing particular embodiments only and is not intended to be limiting.

User interfaces for electronic devices, and associated processes for using these devices, are described below. In some embodiments, the device is a desktop computer with a touch-sensitive surface (e.g., a touch screen display and/or a touchpad). In other embodiments, the device is a portable, movable, and/or mobile electronic device (e.g., a processor, a smart phone, a smart watch, a tablet, a fitness tracking device, a laptop, a head-mounted display (HMD) device, a communal device, a vehicle, a media device, a smart speaker, a smart display, a robot, a television and/or a personal computing device).

In some embodiments, the electronic device is a computer system that is in communication with a display component (e.g., by wireless or wired communication). The display component may be integrated into the computer system or may be separate from the computer system. Additionally, the display component may be configured to provide visual output to a display (e.g., a liquid crystal display, an OLED display, or CRT display). As used herein, "displaying" content includes causing to display the content (e.g., video data rendered or decoded by a display controller) by transmitting, via a wired or wireless connection, data (e.g., image data or video data) to an integrated or external display component to visually produce the content. In some embodiments, visual output is any output that is capable of being perceived by the human eye, including, and not limited to images, videos, graphs, charts, and other graphical representations of data.

In some embodiments, the electronic device is a computer system that is in communication with an audio generation component (e.g., by wireless or wired communication). The audio generation component may be integrated into the computer system or may be separate from the computer system. Additionally, the audio generation component may be configured to provide audio output. Examples of an audio generation component include a speaker, a home theater system, a soundbar, a headphone, an earphone, an earbud, a television speaker, an augmented reality headset speaker, an audio jack, an optical audio output, a Bluetooth audio output, and/or an HDMI audio output). In some embodiments, audio output is any output that is capable of being perceived by the human ear, including, and not limited to sound waves, music, speech, and/or other audible representations of data.

In the discussion that follows, an electronic device that includes particular input and output devices is described. It should be understood, however, that the electronic device optionally includes one or more other input and/or output devices, such as physical user-interface devices (e.g., a physical keyboard, a mouse, and/or a joystick).

FIG. 1 illustrates an example system 100 for implementing techniques described herein. System 100 can perform any of the methods described in FIG. 3 (e.g., method 300) and/or portions of these methods.

In FIG. 1, system 100 includes various components, such as processor(s) 103, RF circuitry(ies) 105, memory(ies) 107, sensors 156 (e.g., image sensor(s), orientation sensor(s), location sensor(s), heart rate monitor(s), temperature sensor(s)), input component(s) 158 (e.g., camera(s) (e.g., a periscope camera, a telephoto camera, a wide-angle camera, and/or an ultra-wide-angle camera), depth sensor(s), microphone(s), touch sensitive surface(s), hardware input mechanism(s), and/or rotatable input mechanism(s)), mobility components (e.g., actuator(s) (e.g., pneumatic actuator(s), hydraulic actuator(s), and/or electric actuator(s)), motor(s), wheel(s), movable base(s), rotatable component(s), translation component(s), and/or rotatable base(s)) and output component(s) 160 (e.g., speaker(s), display component(s), audio generation component(s), haptic output device(s), display screen(s), projector(s), and/or touch-sensitive display(s)). These components optionally communicate over communication bus(es) 123 of the system. Although shown as separate components, in some implementations, various components can be combined and function as a single component, such as a sensor can be an input component.

In some embodiments, system 100 is a mobile and/or movable device (e.g., a tablet, a smart phone, a laptop, head-mounted display (HMD) device, and or a smartwatch). In other embodiments, system 100 is a desktop computer, an embedded computer, and/or a server.

In some embodiments, processor(s) 103 includes one or more general processors, one or more graphics processors, and/or one or more digital signal processors. In some embodiments, memory(ies) 107 is one or more non-transitory computer-readable storage mediums (e.g., flash memory and/or random-access memory) that store computer-readable instructions configured to be executed by processor(s) 103 to perform techniques described herein.

In some embodiments, RF circuitry(ies) 105 includes circuitry for communicating with electronic devices and/or networks (e.g., the Internet, intranets, and/or a wireless network, such as cellular networks and wireless local area networks (LANs)). In some embodiments, RF circuitry(ies) 105 includes circuitry for communicating using near-field communication and/or short-range communication, such as Bluetooth® or Ultra-wideband.

In some embodiments, display(s) 121 includes one or more monitors, projectors, and/or screens. In some embodiments, display(s) 121 includes a first display for displaying images to a first eye of a user and a second display for displaying images to a second eye of the user. In such embodiments, corresponding images can be simultaneously displayed on the first display and the second display. Optionally, the corresponding images include the same virtual objects and/or representations of the same physical objects from different viewpoints, resulting in a parallax effect that provides the user with the illusion of depth of the objects on the displays. In some embodiments, display(s) 121 is a single display. In such embodiments, corresponding images are simultaneously displayed in a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 115 for receiving user inputs, such as tap inputs and swipe inputs. In some embodiments, display(s) 121 and touch-sensitive surface(s) 115 form touch-sensitive display(s).

In some embodiments, sensor(s) 156 includes sensors for detecting various conditions. In some embodiments, sensor(s) 156 includes orientation sensors (e.g., orientation sensor(s) 111) for detecting orientation and/or movement of a platform. For example, system 100 uses orientation sensors to track changes in the location and/or orientation (sometimes collectively referred to as position) of system 100, such as with respect to physical objects in the physical environment. In some embodiments, sensor(s) 156 includes one or more gyroscopes, one or more inertial measurement units, and/or one or more accelerometers. In some embodiments, sensor(s) 156 includes a global positioning sensor (GPS) for detecting a GPS location of a platform. In some embodiments, sensor(s) 156 includes a radar system, LIDAR system, sonar system, image sensors (e.g., image sensor(s) 109, visible light image sensor(s), and/or infrared sensor(s)), depth sensor(s), rangefinder(s), and/or motion detector(s). In some embodiments, sensor(s) 156 includes sensors that are in an interior portion of system 100 and/or sensors that are on an exterior of system 100. In some embodiments, system 100 uses sensor(s) 156 (e.g., interior sensors) to detect a presence and/or state (e.g., location and/or orientation) of a passenger in the interior portion of system 100. In some embodiments, system 100 uses sensor(s) 156 (e.g., external sensors) to detect a presence and/or state of an object external to system 100. In some embodiments, system 100 uses sensor(s) 156 to receive user inputs, such as hand gestures and/or other air gesture. In some embodiments, system 100 uses sensor(s) 156 to detect the location and/or orientation of system 100 in the physical environment. In some embodiments, system 100 uses sensor(s) 156 to navigate system 100 along a planned route, around obstacles, and/or to a destination location. In some embodiments, sensor(s) 156 include one or more sensors for identifying and/or authenticating a user of system 100, such as a fingerprint sensor and/or facial recognition sensor.

In some embodiments, image sensor(s) includes one or more visible light image sensor, such as charged coupled device (CCD) sensors, and/or complementary metal-oxide-semiconductor (CMOS) sensors operable to obtain images of physical objects. In some embodiments, image sensor(s) includes one or more infrared (IR) sensor(s), such as a passive IR sensor or an active IR sensor, for detecting infrared light. For example, an active IR sensor can include an IR emitter, such as an IR dot emitter, for emitting infrared light. In some embodiments, image sensor(s) includes one or more camera(s) configured to capture movement of physical objects. In some embodiments, image sensor(s) includes one or more depth sensor(s) configured to detect the distance of physical objects from system 100. In some embodiments, system 100 uses CCD sensors, cameras, and depth sensors in combination to detect the physical environment around system 100. In some embodiments, image sensor(s) includes a first image sensor and a second image sensor different form the first image sensor. In some embodiments, system 100 uses image sensor(s) to receive user inputs, such as hand gestures and/or other air gestures. In some embodiments, system 100 uses image sensor(s) to detect the location and/or orientation of system 100 in the physical environment.

In some embodiments, system 100 uses orientation sensor(s) for detecting orientation and/or movement of system 100. For example, system 100 can use orientation sensor(s) to track changes in the location and/or orientation of system 100, such as with respect to physical objects in the physical environment. In some embodiments, orientation sensor(s) includes one or more gyroscopes, one or more inertial measurement units, and/or one or more accelerometers.

In some embodiments, system 100 uses microphone(s) to detect sound from one or more users and/or the physical environment of the one or more users. In some embodiments, microphone(s) includes an array of microphones (including a plurality of microphones) that optionally operate in tandem, such as to identify ambient noise or to locate the source of sound in space (e.g., inside system 100 and/or outside of system 100) of the physical environment.

In some embodiments, input component(s) 158 includes one or more mechanical and/or electrical devices for detecting input, such as button(s), slider(s), knob(s), switch(es), remote control(s), joystick(s), touch-sensitive surface(s), keypad(s), microphone(s), and/or camera(s). In some embodiments, input component(s) 158 include one or more input devices inside system 100. In some embodiments, input component(s) 158 include one or more input devices (e.g., a touch-sensitive surface and/or keypad) on an exterior of system 100.

In some embodiments, output device(s) 160 include one or more devices, such as display(s), monitor(s), projector(s), speaker(s), light(s), and/or haptic output device(s). In some embodiments, output device(s) 160 includes one or more external output devices, such as external display screen(s), external light(s), and/or external speaker(s). In some embodiments, output device(s) 160 includes one or more internal output devices, such as internal display screen(s), internal light(s), and/or internal speaker(s).

In some embodiments, environment controls 162 includes mechanical and/or electrical systems for monitoring and/or controlling conditions of an internal portion (e.g., cabin) of system 100. In some embodiments, environmental controls 162 includes fan(s), heater(s), air conditioner(s), and/or thermostat(s) for controlling the temperature and/or airflow within the interior portion of system 100.

In some embodiments, mobility component(s) includes mechanical and/or electrical components that enable a platform to move and/or assist in the movement of the platform. In some embodiments, mobility system 164 includes powertrain(s), drivetrain(s), motor(s) (e.g., an electrical motor), engine(s), power source(s) (e.g., battery(ies)), transmission(s), suspension system(s), speed control system(s), and/or steering system(s). In some embodiments, one or more elements of mobility component(s) are configured to be controlled autonomously or manually (e.g., via system 100 and/or input component(s) 158).

In some embodiments, system 100 performs monetary transactions with or without another computer system. For example, system 100, or another computer system associated with and/or in communication with system 100 (e.g., via a user account described below), is associated with a payment account of a user, such as a credit card account or a checking account. To complete a transaction, system 100 can transmit a key to an entity from which goods and/or services are being purchased that enables the entity to charge the payment account for the transaction. As another example, system 100 stores encrypted payment account information and transmits this information to entities from which goods and/or services are being purchased to complete transactions.

System 100 optionally conducts other transactions with other systems, computers, and/or devices. For example, system 100 conducts transactions to unlock another system, computer, and/or device and/or to be unlocked by another system, computer, and/or device. Unlocking transactions optionally include sending and/or receiving one or more secure cryptographic keys using, for example, RF circuitry(ies) 105.

In some embodiments, system 100 is capable of communicating with other computer systems and/or electronic devices. For example, system 100 can use RF circuitry(ies) 105 to access a network connection that enables transmission of data between systems for the purpose of communication. Example communication sessions include phone calls, e-mails, SMS messages, and/or videoconferencing communication sessions.

In some embodiments, videoconferencing communication sessions include transmission and/or receipt of video and/or audio data between systems participating in the videoconferencing communication sessions, including system 100. In some embodiments, system 100 captures video and/or audio content using sensor(s) 156 to be transmitted to the other system(s) in the videoconferencing communication sessions using RF circuitry(ies) 105. In some embodiments, system 100 receives, using the RF circuitry(ies) 105, video and/or audio from the other system(s) in the videoconferencing communication sessions, and presents the video and/or audio using output component(s) 160, such as display(s) 121 and/or speaker(s). In some embodiments, the transmission of audio and/or video between systems is near real-time, such as being presented to the other system(s) with a delay of less than 0.1, 0.5, 1, or 3 seconds from the time of capturing a respective portion of the audio and/or video.

In some embodiments, the system 100 generates tactile (e.g., haptic) outputs using output component(s) 160. In some embodiments, output component(s) 160 generates the tactile outputs by displacing a moveable mass relative to a neutral position. In some embodiments, tactile outputs are periodic in nature, optionally including frequency(ies) and/or amplitude(s) of movement in two or three dimensions. In some embodiments, system 100 generates a variety of different tactile outputs differing in frequency(ies), amplitude(s), and/or duration/number of cycle(s) of movement included. In some embodiments, tactile output pattern(s) includes a start buffer and/or an end buffer during which the movable mass gradually speeds up and/or slows down at the start and/or at the end of the tactile output, respectively.

In some embodiments, tactile outputs have a corresponding characteristic frequency that affects a "pitch" of a haptic sensation that a user feels. For example, higher frequency(ies) corresponds to faster movement(s) by the moveable mass whereas lower frequency(ies) corresponds to slower movement(s) by the moveable mass. In some embodiments, tactile outputs have a corresponding characteristic amplitude that affects a "strength" of the haptic sensation that the user feels. For example, higher amplitude(s) corresponds to movement over a greater distance by the moveable mass, whereas lower amplitude(s) corresponds to movement over a smaller distance by the moveable mass. In some embodiments, the "pitch" and/or "strength" of a tactile output varies over time.

In some embodiments, tactile outputs are distinct from movement of system 100. For example, system 100 can includes tactile output device(s) that move a moveable mass to generate tactile output and can include other moving part(s), such as motor(s), wheel(s), axel(s), control arm(s), and/or brakes that control movement of system 100. Although movement and/or cessation of movement of system 100 generates vibrations and/or other physical sensations in some situations, these vibrations and/or other physical sensations are distinct from tactile outputs. In some embodiments, system 100 generates tactile output independent from movement of system 100 For example, system 100 can generate a tactile output without accelerating, decelerating, and/or moving system 100 to a new position.

In some embodiments, system 100 detects gesture input(s) made by a user. In some embodiments, gesture input(s) includes touch gesture(s) and/or air gesture(s), as described herein. In some embodiments, touch-sensitive surface(s) 115 identify touch gestures based on contact patterns (e.g., different intensities, timings, and/or motions of objects touching or nearly touching touch-sensitive surface(s) 115). Thus, touch-sensitive surface(s) 115 detect a gesture by detecting a respective contact pattern. For example, detecting a finger-down event followed by detecting a finger-up (e.g., liftoff) event at (e.g., substantially) the same position as the finger-down event (e.g., at the position of a user interface element) can correspond to detecting a tap gesture on the user interface element. As another example, detecting a finger-down event followed by detecting movement of a contact, and subsequently followed by detecting a finger-up (e.g., liftoff) event can correspond to detecting a swipe gesture. Additional and/or alternative touch gestures are possible.

In some embodiments, an air gesture is a gesture that a user performs without touching input component(s) 158. In some embodiments, air gestures are based on detected motion of a portion (e.g., a hand, a finger, and/or a body) of a user through the air. In some embodiments, air gestures include motion of the portion of the user relative to a reference. Example references include a distance of a hand of a user relative to a physical object, such as the ground, an angle of an arm of the user relative to the physical object, and/or movement of a first portion (e.g., hand or finger) of the user relative to a second portion (e.g., shoulder, another hand, or another finger) of the user. In some embodiments, detecting an air gesture includes detecting absolute motion of the portion of the user, such as a tap gesture that includes movement of a hand in a predetermined pose by a predetermined amount and/or speed, or a shake gesture that includes a predetermined speed or amount of rotation of a portion of the user.

In some embodiments, detecting one or more inputs includes detecting speech of a user. In some embodiments, system 100 uses one or more microphones of input component(s) 158 to detect the user speaking one or more words. In some embodiments, system 100 parses and/or communicates information to one or more other systems to determine contents of the speech of the user, including identifying words and/or obtaining a semantic understanding of the words. For example, system processor(s) 103 can be configured to perform natural language processing to detect one or more words and/or determine a likely meaning of the one or more words in the sequence spoken by the user. Additionally or alternatively, in some embodiments, the system 100 determines the meaning of the one or more words in the sequence spoken based upon a context of the user determined by the system 100.

In some embodiments, system 100 outputs spatial audio via output component(s) 160. In some embodiments, spatial audio is output in a particular position. For example, system 100 can play a notification chime having one or more characteristics that cause the notification chime to be generated as if emanating from a first position relative to a current viewpoint of a user (e.g., "spatializing" and/or "spatialization" including audio being modified in amplitude, filtered, and/or delayed to provide a perceived spatial quality to the user).

In some embodiments, system 100 presents visual and/or audio feedback indicating a position of a user relative to a current viewpoint of another user, thereby informing the other user about an updated position of the user. In some embodiments, playing audio corresponding to a user includes changing one or more characteristics of audio obtained from another computer system to mimic an effect of placing an audio source that generates the play back of audio within a position corresponding to the user, such as a position within a three-dimensional environment that the user moves to, spawns at, and/or is assigned to. In some embodiments, a relative magnitude of audio at one or more frequencies and/or groups of frequencies is changed, one or more filters are applied to audio (e.g., directional audio filters), and/or the magnitude of audio provided via one or more channels are changed (e.g., increased or decreased) to create the perceived effect of the physical audio source. In some embodiments, the simulated position of the simulated audio source relative to a floor of the three-dimensional environment matches an elevation of a head of a participant providing audio that is generated by the simulated audio source, or is a predetermined one or more elevations relative to the floor of the three-dimensional environment. In some embodiments, in accordance with a determination that the position of the user will correspond to a second position, different from the first position, and that one or more first criteria are satisfied, system 100 presents feedback including generating audio as if emanating from the second position.

In some embodiments, system 100 communicates with one or more accessory devices. In some embodiments, one or more accessory devices is integrated with system 100. In some embodiments, one or more accessory devices is external to system 100. In some embodiments, system 100 communicates with accessory device(s) using RF circuitry(ies) 105 and/or using a wired connection. In some embodiments, system 100 controls operation of accessory device(s), such as door(s), window(s), lock(s), speaker(s), light(s), and/or camera(s). For example, system 100 can control operation of a motorized door of system 100. As another example, system 100 can control operation of a motorized window included in system 100. In some embodiments, accessory device(s), such as remote control(s) and/or other computer systems (e.g., smartphones, media players, tablets, computers, and/or wearable devices) functioning as input devices control operations of system 100. For example, a wearable device (e.g., a smart watch) functions as a key to initiate operation of an actuation system of system 100. In some embodiments, system 100 acts as an input device to control operations of another system, device, and/or computer, such as the platform 100 functioning as a key to initiate operation of an actuation system of a platform associated with another system, device, and/or computer.

In some embodiments, digital assistant(s) help a user perform various functions using system 100. For example, a digital assistant can provide weather updates, set alarms, and perform searches locally and/or using a network connection (e.g., the Internet) via a natural-language interface. In some embodiments, a digital assistant accepts requests at least partially in the form of natural language commands, narratives, requests, statements, and/or inquiries. In some embodiments, a user requests an informational answer and/or performance of a task using the digital assistant. For example, in response to receiving the question "What is the current temperature?," the digital assistant answers "It is 30 degrees." As another example, in response to receiving a request to perform a task, such as "Please invite my family to dinner tomorrow," the digital assistant can acknowledge the request by playing spoken words, such as "Yes, right away," and then send the requested calendar invitation on behalf of the user to each family member of the user listed in a contacts list for the user. In some embodiments, during performance of a task requested by the user, the digital assistant engages with the user in a sustained conversation involving multiple exchanges of information over a period of time. Other ways of interacting with a digital assistant are possible to request performance of a task and/or request information. For example, the digital assistant can respond to the user in other forms, e.g., displayed alerts, text, videos, animations, music, etc. In some embodiments, the digital assistant includes a client-side portion executed on system 100 and a server-side portion executed on a server in communication with system 100. The client-side portion can communicate with the server through a network connection using RF circuitry(ies) 105. The client-side portion can provide client-side functionalities, input and/or output processing and/or communication with the server, for example. In some embodiments, the server-side portion provides server-side functionalities for any number client-side portions of multiple systems.

In some embodiments, system 100 is associated with one or more user accounts. In some embodiments, system 100 saves and/or encrypts user data, including files, settings, and/or preferences in association with particular user accounts. In some embodiments, user accounts are password-protected and system 100 requires user authentication before accessing user data associated with an account. In some embodiments, user accounts are associated with other system(s), device(s), and/or server(s). In some embodiments, associating one user account with multiple systems enables those systems to access, update, and/or synchronize user data associated with the user account. For example, the systems associated with a user account can have access to purchased media content, a contacts list, communication sessions, payment information, saved passwords, and other user data. Thus, in some embodiments, user accounts provide a secure mechanism for a customized user experience.

FIGS. 2A-2E illustrate example techniques for compensating for motion while using a computer system, in accordance with some embodiments. FIG. 3 is a flow diagram of an exemplary method 300 for compensating for motion while using a computer system, in accordance with some embodiments. The example embodiments shown in FIGS. 2A-2E are used to illustrate the processes described below, including the processes in FIG. 3.

Figure 2A:
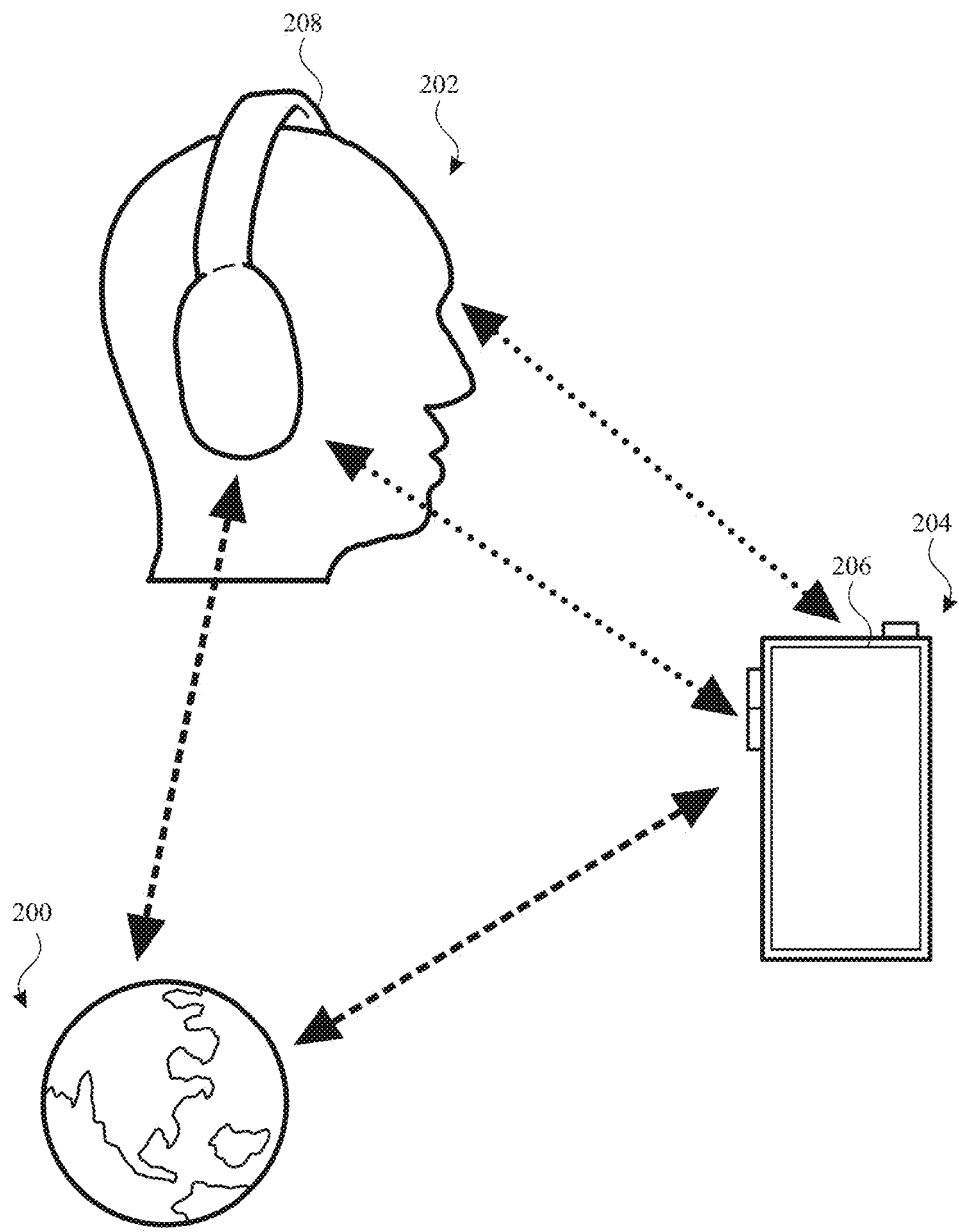
FIGS. 2A-2E illustrate example techniques for compensating for motion while using a computer system, in accordance with some embodiments.
Figure 3:
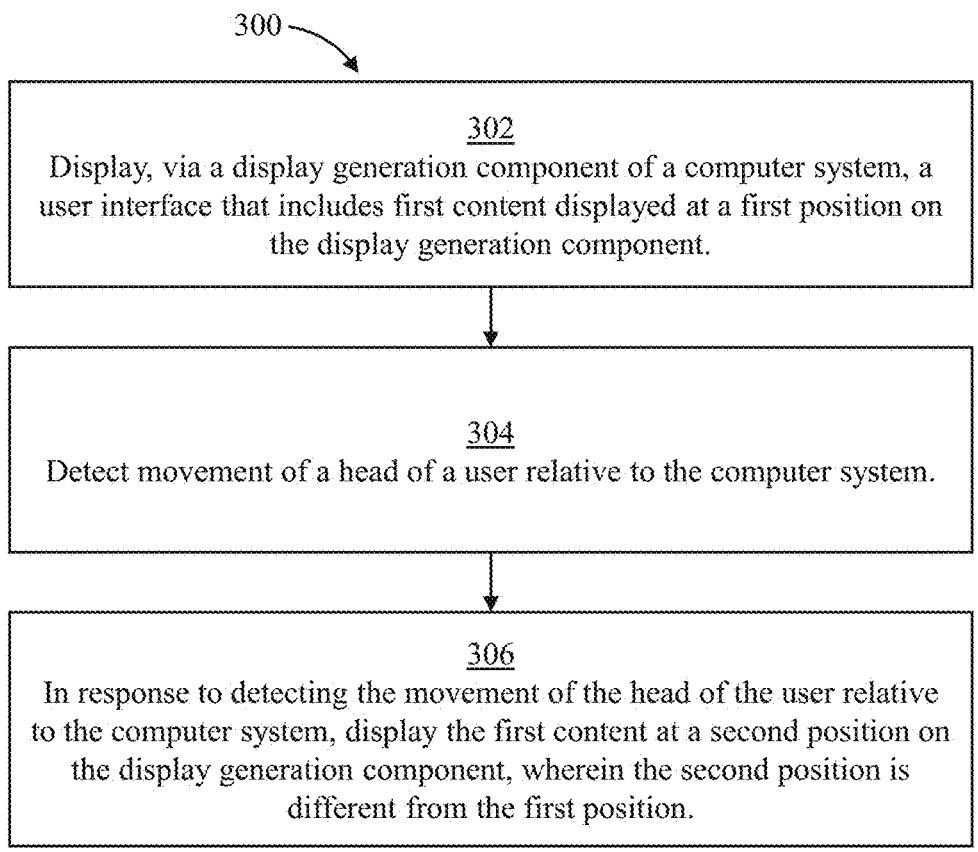
FIG. 3 is a flow diagram illustrating methods for compensating for motion while using a computer system, in accordance with some embodiments.

FIG. 2A illustrates a conceptual diagram of user 202 and computer system 204 (e.g., a smartphone) in physical environment 200. In some embodiments user 202 uses computer system 204 while riding in a moveable platform (e.g., a platform and/or a vehicle). Computer system 204 includes touch-sensitive display 206. In some embodiments, computer system 204 includes an inertial measurement unit and/or other sensors that detect and/or determine a position and/or motion (e.g., velocity, acceleration, rotation, and/or vibration) of computer system 204. In some embodiments, computer system 204 includes one or more sensors (e.g., cameras) that detect and/or determine a position and/or motion of a head of user 202 (e.g., relative to physical environment 200 and/or relative to computer system 204). In FIG. 2A, user 202 is wearing head-mounted device 208 (e.g., headphones and/or earbuds). In some embodiments, head-mounted device 208 is, or includes one or more features of, system 100 and/or device 101. In some embodiments, head-mounted device 208 includes an inertial measurement unit and/or other sensors that detect and/or determine a position and/or motion (e.g., velocity, acceleration, rotation, and/or vibration) of head-mounted device 208. When user 202 is wearing head-mounted device 208 as shown in FIG. 2A, a position and/or motion (e.g., velocity, acceleration, rotation, and/or vibration) of the head of user 202 is detected and/or determined based on the position and/or motion of head-mounted device 208. In some embodiments, the position and/or motion of user 202 is based on a combination of position and/or motion detected by head-mounted device 208 and of position and/or motion of user 202 detected by computer system 204 (e.g., using sensor fusion).

FIGS. 2B-2E each include a diagram showing the physical configuration of physical environment 200, user 202, and computer system 204 relative to each other and an enlarged view of computer system 204 showing the content displayed on display 206 for the corresponding configuration. In the illustrated embodiment, computer system 204 displays content 214 (e.g., a web browser, web page, and/or content thereof such as text, images, and/or other graphical content) and dynamic graphical element 216.

Figure 2B:
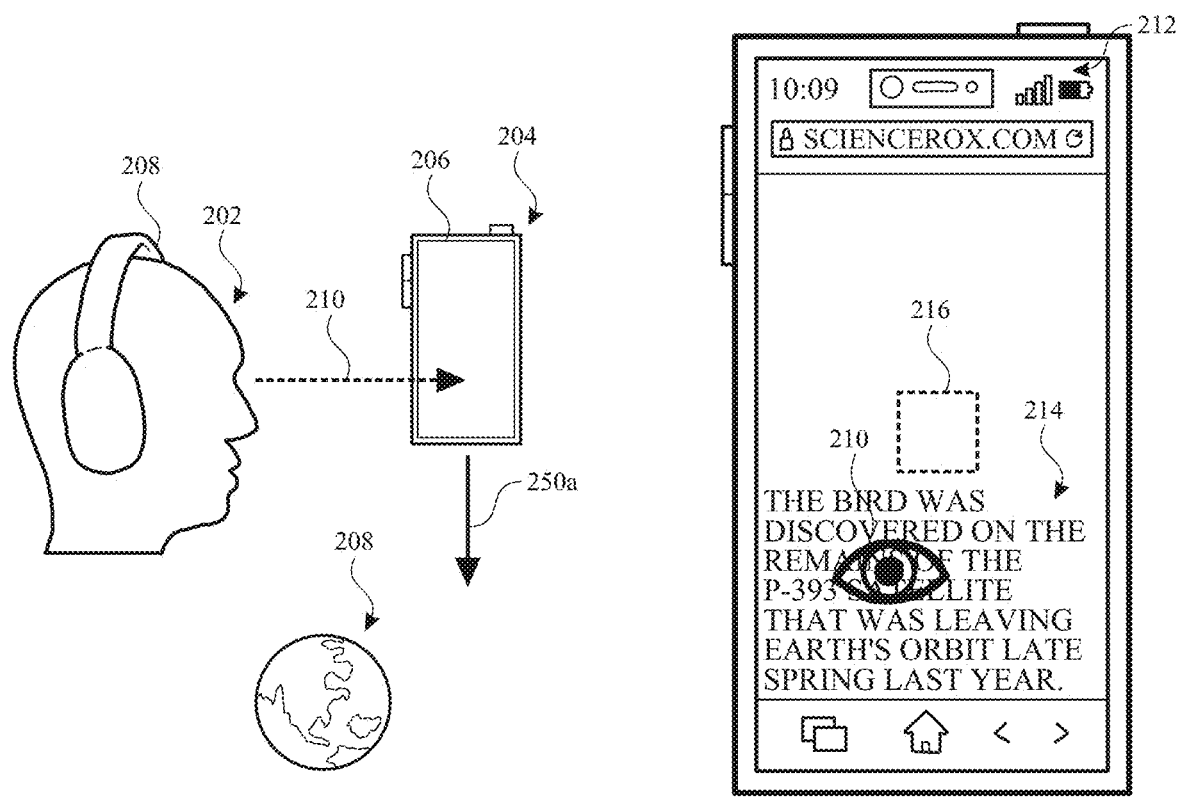

FIG. 2B illustrates a configuration in which the eyes of user 202 are aligned with a lower portion of display 206, as indicated by position indicator 210. In FIG. 2B, content 214 is displayed at a first content position that aligns with the position of the eyes of user 202 (e.g., user 202 is looking at and/or reading content 214). Dynamic graphical element 216 is displayed in a first state (e.g., a first position, size, shape, opacity, and/or other visible state). In some embodiments, the state of the dynamic graphical element 216 in FIG. 2B corresponds to a state when user 202 is not moving (or, in some embodiments, not accelerating) relative to physical environment 200. In some embodiments, dynamic graphical element 216 is not displayed when user 202 is not moving.

In FIG. 2B, computer system 204 moves downward relative to user 202 and physical environment 200, as represented my movement indicator 250a. In response to detecting the movement represented by movement indicator 250a, computer system 204 moves content 214 upward on display 206. In embodiment illustrated in FIG. 2C, computer system 204 moves content 214 upward the same distance as the movement of computer system 204 relative to user 202 represented by movement indicator 250a such that content 214 remains in the same position relative to user 202, as indicated by position indicator 210 (e.g., the eyes of user 202 remain aligned with the same portion of content 214 as in FIG. 2B). In this way, computer system 204 provides user 202 with a stabilized view of content 214, which can assist user 202 with viewing content 214 when the relative position between user 202 and computer system 204 is changing.

Figure 2C:
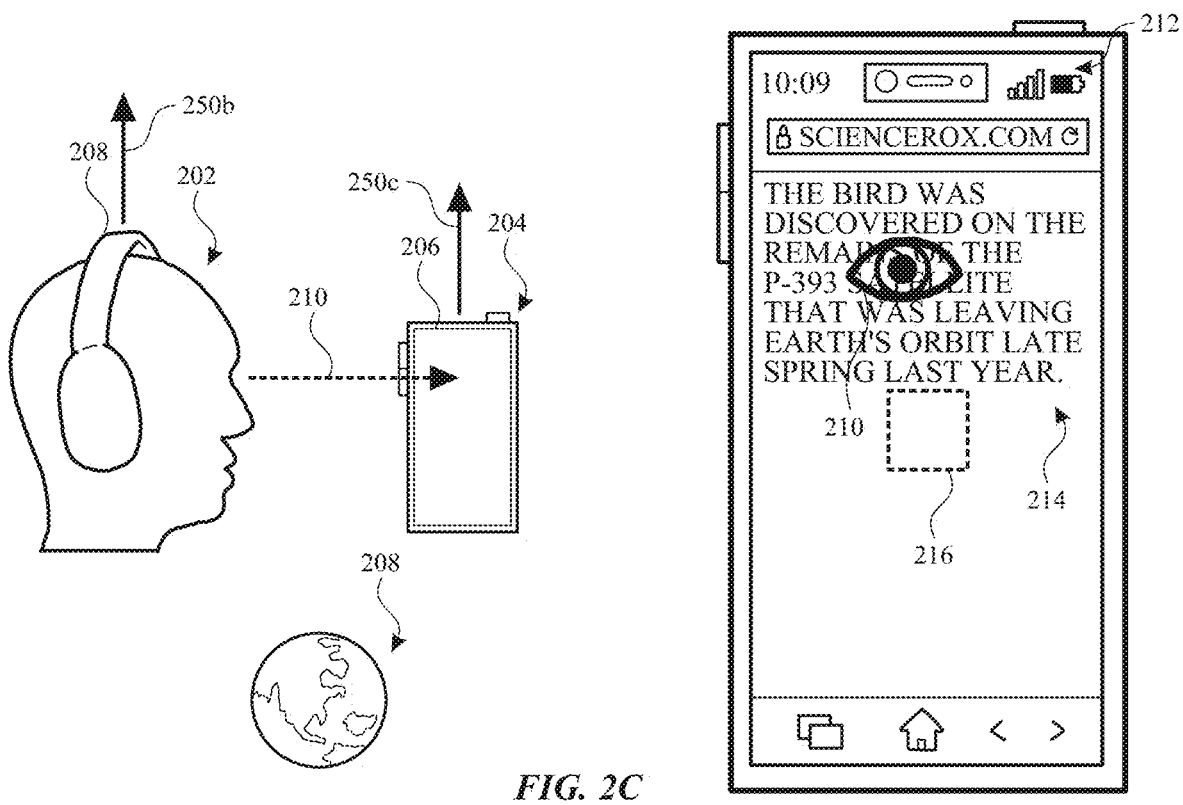

Regarding dynamic graphical element 216, because user 202 is not moving relative to physical environment 200 in FIG. 2B, dynamic graphical element 216 remains in the same state (e.g., does not move and/or otherwise visibly change), as shown in FIG. 2C.

In FIG. 2C, user 202 moves upward relative to physical environment 200 (as represented by movement indicator 250b) and computer system 204 moves upward relative to physical environment 200 (as representation by movement indicator 250c). In the embodiment illustrated in FIG. 2C, user 202 and computer system 204 move in the same direction and by the same amount relative to physical environment 200 such that the position of user 202 relative to computer system 204 does not change, as indicated by position indicator 210 in FIG. 2D. Because there is no change in the relative position between user 202 and computer system 204, computer system 204 maintains content 214 in the same position on display 206 (e.g., does not move content 214 on display 206).

In response to detecting the movement of user 202 relative to physical environment 200 in FIG. 2C (as represented by movement indicator 250b), computer system 204 changes the state of dynamic graphical element 216. In the embodiment illustrated in FIG. 2D, in response to detecting the movement of user 202 relative to physical environment 200 in FIG. 2C, computer system 204 moves dynamic graphical element 216 downward on display 206, enlarges dynamic graphical element 216 (e.g., relative to the size of dynamic graphical element 216 in FIG. 2C), and increases an opacity of dynamic graphical element 216 (e.g., relative to the opacity of dynamic graphical element 216 in FIG. 2C). In some embodiments, computer system 204 alternatively, or additionally, changes the shape, color, and/or orientation of dynamic graphical element 216 (e.g., from a square to a circle or a star) in response to detecting motion of user 202 relative to physical environment 200. In the embodiment illustrated in FIG. 2D (and in FIG. 2E described below), computer system 204 moves dynamic graphical element 216 in a direction that is opposite of a direction of the movement of user 202 (e.g., similar to the way in which user 202 would lean or feel as though he is being pushed to the right when turning left in a moving vehicle). In some embodiments, computer system 204 moves dynamic graphical element 216 in the same direction as the movement of user 202. In some embodiments, in response to detecting motion of user 202 relative to physical environment 200, computer system 204 changes a size, shape, color, orientation, and/or opacity of dynamic graphical element 216 without changing the position of dynamic graphical element 216. Changing the state of dynamic graphical element 216) in response to detecting motion of user 202 relative to physical environment 200 provides user 202 of a visual indication that corresponds to motion that user 202 experiences (e.g., feels) while looking at computer system 204, which can increase comfort while using computer system 204 when user 202 is moving.

Figure 2D:
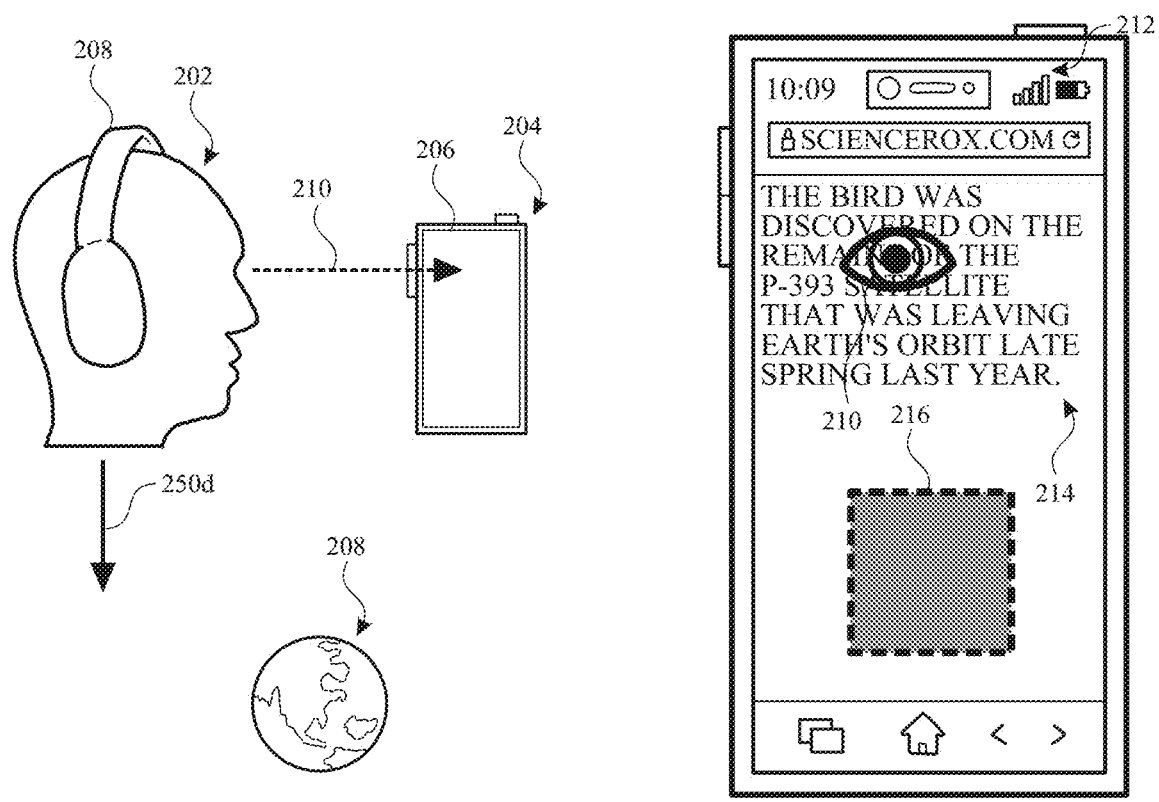

In FIG. 2D, user 202 moves downward relative to physical environment 200 and relative to computer system 204, as represented by movement indicator 250d (e.g., computer system 204 does not move relative to physical environment 200 in FIG. 2D).

Figure 2E:
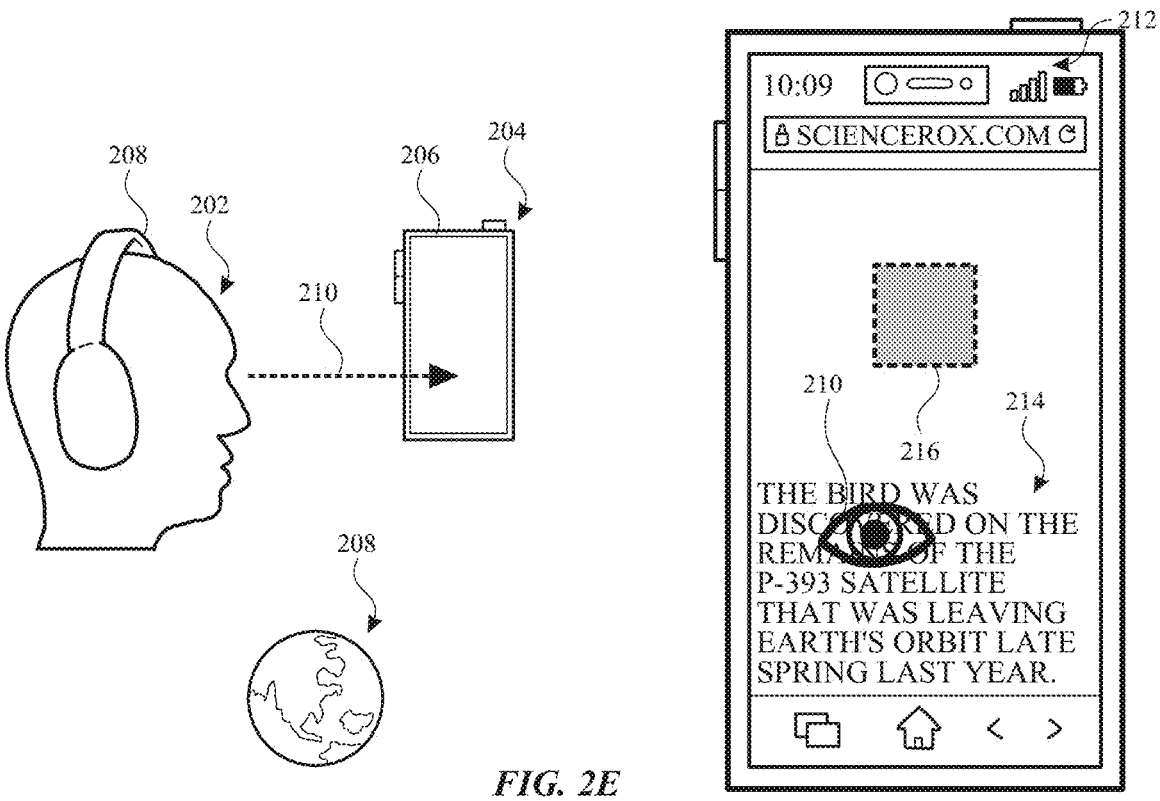

In embodiment illustrated in FIG. 2E, in response to the movement of user 202 represented by movement indicator 250d, computer system 204 moves content 214 downward on display 206 by the same distance as the movement of user 202 relative to computer system 204 such that content 214 remains in the same position relative to user 202, as indicated by position indicator 210 (e.g., the eyes of user 202 remain aligned with the same portion of content 214 as in FIG. 2D).

In response to detecting the movement of user 202 relative to physical environment 200 in FIG. 2D (as represented by movement indicator 250d), computer system 204 changes the state of dynamic graphical element 216. In the embodiment illustrated in FIG. 2E, in response to detecting the movement of user 202 relative to physical environment 200 in FIG. 2D, computer system 204 moves dynamic graphical element 216 upward on display 206, changes the size of dynamic graphical element 216, and changes an opacity of dynamic graphical element 216. With respect to the change in size and opacity of dynamic graphical element 216, the size and opacity of dynamic graphical element 216 is greater than in FIG. 2B, in which there was no motion. Compared to the movement represented by movement indicator 250b in FIG. 2C, the movement represented by movement indicator 250d is less than the movement represented by movement indicator 250b. Because the movement represented by movement indicator 250d is less than the movement represented by movement indicator 250b, the size of dynamic graphical element 216 is smaller in FIG. 2E than in FIG. 2D and the opacity of dynamic graphical element 216 is less (e.g., more transparent) in FIG. 2E than in FIG. 2D. Also, because the movement represented by movement indicator 250d is less than the movement represented by movement indicator 250b, computer system 204 moves dynamic graphical element 216 in FIG. 2E a smaller distance from the position in FIG. 2B (when user 202 is not moving relative to physical environment 200) compared to the distance of dynamic graphical element 216 in FIG. 2D from the position in FIG. 2B.

Additional descriptions regarding FIGS. 2A-2E are provided below in reference to method 300 described with respect to FIG. 3.

FIG. 3 is a flow diagram of an exemplary method 300 for compensating for motion while using a computer system, in accordance with some embodiments. In some embodiments, method 300 is performed at a computer system (e.g., computer system 152, 204, an electronic device, a smartphone, a smartwatch, a laptop computer, a tablet computer, and/or a head-mounted device)) and/or a platform (e.g., a vehicle). In some embodiments, the computer system is within and/or a part of the platform. In some embodiments, the computer system includes one or more input devices, such as, e.g., 156, 158, a mouse, a touch-sensitive surface, and/or a touch-sensitive display. In some embodiments, method 300 is governed by instructions that are stored in a non-transitory (or transitory) computer-readable storage medium and that are executed by one or more processors of a computer system (e.g., 152) and/or platform, such as the one or more processors 103 of system 100. Some operations in method 300 are, optionally, combined and/or the order of some operations is, optionally, changed.

In some embodiments, according to method 300, the computer system displays (302), via a display component (e.g., 121 and/or 206) (e.g., a display, a display device, a monitor, and/or a touch-sensitive display) of the computer system, a user interface (e.g., 212) that includes first content (e.g., 214) (e.g., an application, a graphical user interface window, text, and/or one or more images) displayed at a first position on the display component (e.g., as shown in FIG. 2B). The computer system detects (304) movement of a head of a user relative to the computer system (e.g., user 202 moves relative to computer system 204 in FIGS. 2B and 2D). In response to detecting the movement of the head of the user relative to the computer system, the computer system displays (306) the first content at a second position (e.g., as shown in FIG. 2C) on the display component (e.g., move the first content from the first position to the second position), wherein the second position is different from the first position.

In some embodiments, the computer system displays a set of one or more graphical elements (e.g., 216) (e.g., a motion cue, a single graphical element, two or more graphical elements, and/or an array of graphical elements), in a first state (e.g., size, color, transparency, pattern, and/or position) (e.g., 216 in FIG. 2C); the computer system detects movement (e.g., 250b and/or 250d) of the head of the user relative to a physical environment (e.g., 200) (e.g., movement of user 202 in FIGS. 2C and 2D); and in response to detecting the movement of the head of the user relative to the physical environment, the computer system displays the set of one or more graphical elements in a second state (e.g., change the set of one or more graphical elements from the first state to the second state) (e.g., 216 in FIG. 2D and/or FIG. 2E), wherein the second state is different from the first state. In some embodiments, the set of one or more graphical elements includes two or more graphical elements that maintain a spatial relationship relative to each other (e.g., the same distance between elements) when the set of one or more graphical elements moves. In some embodiments, the second state (and/or, in some embodiments, the change between the first state and the second state) is based on the movement (e.g., 250*b* and/or 250*d*) of the head of the user relative to the physical environment (e.g., as indicated in FIGS. 2C and 2D) (e.g., a magnitude and/or direction of the change in the state of the set of one or more graphical elements is based on a magnitude and/or direction of the movement of the head of the user relative to the physical environment). In some embodiments, displaying the set of one or more graphical elements (e.g., 216) in the second state includes one or more of translating the set of one or more graphical elements, changing a size of the set of one or more graphical elements, or changing a transparency of the set of one or more graphical elements (e.g., as shown in FIGS. 2D and 2E compared to FIGS. 2B and 2C).

In some embodiments, displaying the first content at the second position on the display component includes selecting the second position such that the second position relative to a position of the head of the user after the movement of the head of the user is the same as the first position relative to the position of the head of the user before the movement of the head of the user (e.g., the position of the first content is stabilized relative to the position of the head of the user; and/or the position of the first content is stable from the perspective of the user) (e.g., content 214 remains directly in front of the eyes of user 202 in FIGS. 2B-2E). In some embodiments, displaying the first content at the second position on the display component includes selecting the second position on the display component based on movement (e.g., 250*d*) of the head of the user relative to a physical environment (e.g., 200) (e.g., the first content moves based on motion of the head of the user relative to the physical environment) (e.g., the movement of the head of the user relative to the computer system includes movement of the head of the user relative to the physical environment). In some embodiments, displaying the first content at the second position on the display component includes selecting the second position on the display component based on movement (e.g., 250*a*) of the display component (and/or, in some embodiments, the computer system) relative to a physical environment (e.g., 200) (e.g., the first content moves based on motion of the display component and/or the computer system relative to the physical environment) (e.g., the movement of the head of the user relative to the computer system includes movement of the display component and/or the computer system relative to the physical environment).

In some embodiments, the computer system displays (e.g., concurrently with the first content) a set of one or more graphical elements (e.g., a motion cue, a single graphical element, two or more graphical elements, and/or an array of graphical elements), in a first state (e.g., size, color, transparency, pattern, and/or position); the computer system detects motion having a first frequency (e.g., motion of the head of the user relative to the display component and/or the computer system); in response to detecting the motion having the first frequency: in accordance with a determination that the first frequency satisfies (e.g., is greater than, is equal to, or is greater than or equal to) a threshold content-stabilization frequency, the computer system moves (e.g., adjusts) the first content based on the motion having the first frequency; and in accordance with a determination that the first frequency does not satisfy (e.g., is less than or is equal to or less than) the threshold content-stabilization frequency, the computer system forgoes moving the first content based on the motion having the first frequency; the computer system detects motion having a second frequency (e.g., movement of the head of the user relative to the physical environment); and in response to detecting the movement of the head of the user relative to the physical environment: in accordance with a determination that the second frequency satisfies (e.g., is less than or is equal to or less than) a threshold motion-cue frequency, the computer system adjusts (e.g., moves, enlarges, reduces a size of, changes an opacity or, and/or changes a shape of) the set of one or more graphical elements based on the motion having the second frequency; and in accordance with a determination that the second frequency does not satisfy (e.g., is greater than, is equal to, or is greater than or equal to) the threshold motion-cue frequency, the computer system forgoes adjusting the set of one or more graphical elements based on the motion having the second frequency. For example, the first content is moved in response to detecting motion of the head of the user relative to the display component that exceeds a threshold frequency but not in response to detecting motion that does not exceed the threshold frequency (e.g., the first content is moved in response to high-frequency motion). For example, the set of one or more graphical elements is moved in response to detecting motion of the head of the user relative to the physical environment that is below a threshold frequency but not in response to detecting motion that exceeds the threshold frequency (e.g., the set of one or more graphical elements is moved in response to low-frequency motion). In some embodiments, the first content is stabilized based on higher-frequency motion and the set of one or more graphical elements is moved based on lower-frequency motion. In some embodiments, the set of one or more graphical elements includes two or more graphical elements that maintain a spatial relationship relative to each other (e.g., the same distance between elements) when the set of one or more graphical elements moves. In some embodiments, the threshold content-stabilization frequency is greater than the threshold motion-cue frequency.

In some embodiments, detecting the movement of the head of the user relative to the computer system includes detecting movement of the head of the user relative to the physical environment using a head-mounted device (e.g., 208) (and/or, in some embodiments, headphones, ear buds and/or ear pods) that is worn on the head of the user (e.g., the head-mounted device includes an inertial measurement unit that detects and/or measures motion of the head of the user relative to the physical environment). In some embodiments, detecting the movement of the head of the user relative to the computer system includes detecting movement of the head of the user relative to the electronic using one or more sensors (e.g., a camera, 109, and/or 111) of the computer system (e.g., 204) (e.g., the computer system includes one or more cameras that track the head of the user). In some embodiments, position and/or motion data captured by the computer system is supplemented (e.g., via sensor fusion) with position and/or motion data captured by the head-mounted device (e.g., to determine the movement of the head relative to the computer system).

In some embodiments, detecting the movement of the head of the user relative to the computer system includes detecting a position of the head of the user (e.g., relative to the computer system) using the computer system (e.g., using one or more sensors of the computer system, such as one or more cameras and/or image sensor(s) 109). In some embodiments, detecting the position of the head of the user using the computer system includes detecting the position of the head of the user using one or more sensors (e.g., cameras and/or image sensor(s) 109) on a first side (e.g., a front side and/or a side that includes a display, such as display 206) of the computer system. In some embodiments, detecting the movement of the head of the user relative to the computer system includes detecting the state (e.g., position and/or movement) of the head of the user using one or more sensors (e.g., cameras, 109, and/or 111) of the computer system and detecting the state (e.g., position and/or movement) of the head of the user using a head-mounted device (e.g., 208, headphones, earbuds, and/or ear pods) that are worn on the head of the user. In some embodiments, position and/or motion data captured by the computer system is used to supplement (e.g., via sensor fusion) position and/or motion data captured by the head-mounted device (e.g., to determine the movement of the head relative to the computer system). In some embodiments, detecting movement of the head of the user relative to the computer system includes detecting motion of the computer system relative to the physical environment via one or more sensors (e.g., an inertial measurement unit and/or orientation sensor(s) 111) of the computer system.

This disclosure, for purpose of explanation, has been described with reference to specific embodiments. The discussions above are not intended to be exhaustive or to limit the disclosure and/or the claims to the specific embodiments. Modifications and/or variations are possible in view of the disclosure. Some embodiments were chosen and described in order to explain principles of techniques and their practical applications. Others skilled in the art are thereby enabled to utilize the techniques and various embodiments with modifications and/or variations as are suited to a particular use contemplated.

Although the disclosure and embodiments have been fully described with reference to the accompanying drawings, it is to be noted that various changes and/or modifications will become apparent to those skilled in the art. Such changes and/or modifications are to be understood as being included within the scope of this disclosure and embodiments as defined by the claims.

It is the intent of this disclosure that any personal information of users should be gathered, managed, and handled in a way to minimize risks of unintentional and/or unauthorized access and/or use.

Therefore, although this disclosure broadly covers use of personal information to implement one or more embodiments, this disclosure also contemplates that embodiments can be implemented without the need for accessing such personal information.

What is claimed is:

1. A computer system, comprising:
   one or more processors; and
   memory storing one or more programs configured to be executed by the one or more processors, the one or more programs including instructions for:
      displaying, via a display component of a computer system;
         a user interface that includes first content displayed at a first position on the display component; and
         a set of one or more graphical elements in a first state, wherein the one or more graphical elements are different from the first content;
      detecting movement of a head of a user relative to the computer system;
      in response to detecting the movement of the head of the user relative to the computer system, displaying the first content at a second position on the display component, wherein the second position is different from the first position;
      detecting movement of the head of the user relative to a physical environment; and
      in response to detecting the movement of the head of the user relative to the physical environment, displaying the set of one or more graphical elements in a second state, wherein the second state is different from the first state.

2. The computer system of claim 1, wherein the second state is based on the movement of the head of the user relative to the physical environment.

3. The computer system of claim 1, wherein displaying the set of one or more graphical elements in the second state includes one or more of translating the set of one or more graphical elements, changing a size of the set of one or more graphical elements, or changing a transparency of the set of one or more graphical elements.

4. The computer system of claim 1, wherein displaying the first content at the second position on the display component includes selecting the second position such that the second position relative to a position of the head of the user after the movement of the head of the user is the same as the first position relative to the position of the head of the user before the movement of the head of the user.

5. The computer system of claim 4, wherein displaying the first content at the second position on the display component includes selecting the second position on the display component based on movement of the head of the user relative to the physical environment.

6. The computer system of claim 4, wherein displaying the first content at the second position on the display component includes selecting the second position on the display component based on movement of the display component relative to the physical environment.

7. The computer system of claim 1, wherein the one or more programs further include instructions for:
   displaying the set of one or more graphical elements in the first state;
   detecting motion having a first frequency;
   in response to detecting the motion having the first frequency:
      in accordance with a determination that the first frequency satisfies a threshold content-stabilization frequency, moving the first content based on the motion having the first frequency;
      in accordance with a determination that the first frequency does not satisfy the threshold content-stabilization frequency, forgoing moving the first content based on the motion having the first frequency;
   detecting motion having a second frequency; and
   in response to detecting the movement of the head of the user relative to the physical environment:
      in accordance with a determination that the second frequency satisfies a threshold motion-cue frequency, adjusting the set of one or more graphical elements based on the motion having the second frequency; and
      in accordance with a determination that the second frequency does not satisfy the threshold motion-cue frequency, forgoing adjusting the set of one or more graphical elements based on the motion having the second frequency.

8. The computer system of claim 1, wherein detecting the movement of the head of the user relative to the computer system includes detecting movement of the head of the user relative to the physical environment using a head-mounted device that is worn on the head of the user.

9. The computer system of claim 8, wherein detecting the movement of the head of the user relative to the computer system includes detecting movement of the head of the user relative to computer system using one or more sensors of the computer system.

10. The computer system of claim 1, wherein detecting the movement of the head of the user relative to the computer system includes detecting a position of the head of the user using the computer system.

11. The computer system of claim 10, wherein detecting the position of the head of the user using the computer system includes detecting the position of the head of the user using one or more sensors on a first side of the computer system.

12. The computer system of claim 10, wherein detecting the movement of the head of the user relative to the computer system includes detecting a state of the head of the user using one or more sensors of the computer system and detecting the state of the head of the user using a head-mounted device that is worn on the head of the user.

13. The computer system of claim 1, wherein detecting movement of the head of the user relative to the computer system includes detecting motion of the computer system relative to the physical environment via one or more sensors of the computer system.

14. A non-transitory computer-readable storage medium storing one or more programs configured to be executed by one or more processors of a computer system, the one or more programs including instructions for:
   displaying, via a display component of a computer system:
      a user interface that includes first content displayed at a first position on the display component; and
      a set of one or more graphical elements in a first state, wherein the one or more graphical elements are different from the first content;
   detecting movement of a head of a user relative to the computer system;
   in response to detecting the movement of the head of the user relative to the computer system, displaying the first content at a second position on the display component, wherein the second position is different from the first position;
   detecting movement of the head of the user relative to a physical environment; and
   in response to detecting the movement of the head of the user relative to the physical environment, displaying the set of one or more graphical elements in a second state, wherein the second state is different from the first state.

15. A method, comprising:
   displaying, via a display component of a computer system:
      a user interface that includes first content displayed at a first position on the display component; and
      a set of one or more graphical elements in a first state, wherein the one or more graphical elements are different from the first content;
   detecting movement of a head of a user relative to the computer system;
   in response to detecting the movement of the head of the user relative to the computer system, displaying the first content at a second position on the display component, wherein the second position is different from the first position;
   detecting movement of the head of the user relative to a physical environment; and
   in response to detecting the movement of the head of the user relative to the physical environment, displaying the set of one or more graphical elements in a second state, wherein the second state is different from the first state.

16. The non-transitory computer-readable storage medium of claim 14, wherein the second state is based on the movement of the head of the user relative to the physical environment.

17. The non-transitory computer-readable storage medium of claim 14, wherein displaying the set of one or more graphical elements in the second state includes one or more of translating the set of one or more graphical elements, changing a size of the set of one or more graphical elements, or changing a transparency of the set of one or more graphical elements.

18. The non-transitory computer-readable storage medium of claim 14, wherein displaying the first content at the second position on the display component includes selecting the second position such that the second position relative to a position of the head of the user after the movement of the head of the user is the same as the first position relative to the position of the head of the user before the movement of the head of the user.

19. The non-transitory computer-readable storage medium of claim 18, wherein displaying the first content at the second position on the display component includes selecting the second position on the display component based on movement of the head of the user relative to the physical environment.

20. The non-transitory computer-readable storage medium of claim 18, wherein displaying the first content at the second position on the display component includes selecting the second position on the display component based on movement of the display component relative to the physical environment.

21. The non-transitory computer-readable storage medium of claim 14, wherein the one or more programs further include instructions for:
   displaying the set of one or more graphical elements in the first state;
   detecting motion having a first frequency;
   in response to detecting the motion having the first frequency:
      in accordance with a determination that the first frequency satisfies a threshold content-stabilization frequency, moving the first content based on the motion having the first frequency;
      in accordance with a determination that the first frequency does not satisfy the threshold content-stabilization frequency, forgoing moving the first content based on the motion having the first frequency;
   detecting motion having a second frequency; and
   in response to detecting the movement of the head of the user relative to the physical environment:
      in accordance with a determination that the second frequency satisfies a threshold motion-cue frequency, adjusting the set of one or more graphical elements based on the motion having the second frequency; and
      in accordance with a determination that the second frequency does not satisfy the threshold motion-cue frequency, forgoing adjusting the set of one or more graphical elements based on the motion having the second frequency.

22. The non-transitory computer-readable storage medium of claim 14, wherein detecting the movement of the head of the user relative to the computer system includes detecting movement of the head of the user relative to the physical environment using a head-mounted device that is worn on the head of the user.

23. The non-transitory computer-readable storage medium of claim 22, wherein detecting the movement of the head of the user relative to the computer system includes detecting movement of the head of the user relative to computer system using one or more sensors of the computer system.

24. The non-transitory computer-readable storage medium of claim 14, wherein detecting the movement of the head of the user relative to the computer system includes detecting a position of the head of the user using the computer system.

25. The non-transitory computer-readable storage medium of claim 24, wherein detecting the position of the head of the user using the computer system includes detecting the position of the head of the user using one or more sensors on a first side of the computer system.

26. The non-transitory computer-readable storage medium of claim 24, wherein detecting the movement of the head of the user relative to the computer system includes detecting a state of the head of the user using one or more sensors of the computer system and detecting the state of the head of the user using a head-mounted device that is worn on the head of the user.

27. The non-transitory computer-readable storage medium of claim 14, wherein detecting movement of the head of the user relative to the computer system includes detecting motion of the computer system relative to the physical environment via one or more sensors of the computer system.

28. The method of claim 15, wherein the second state is based on the movement of the head of the user relative to the physical environment.

29. The method of claim 15, wherein displaying the set of one or more graphical elements in the second state includes one or more of translating the set of one or more graphical elements, changing a size of the set of one or more graphical elements, or changing a transparency of the set of one or more graphical elements.

30. The method of claim 15, wherein displaying the first content at the second position on the display component includes selecting the second position such that the second position relative to a position of the head of the user after the movement of the head of the user is the same as the first position relative to the position of the head of the user before the movement of the head of the user.

31. The method of claim 30, wherein displaying the first content at the second position on the display component includes selecting the second position on the display component based on movement of the head of the user relative to the physical environment.

32. The method of claim 30, wherein displaying the first content at the second position on the display component includes selecting the second position on the display component based on movement of the display component relative to the physical environment.

33. The method of claim 15, further comprising:
displaying the set of one or more graphical elements in the first state;
detecting motion having a first frequency;
in response to detecting the motion having the first frequency:
in accordance with a determination that the first frequency satisfies a threshold content-stabilization frequency, moving the first content based on the motion having the first frequency;
in accordance with a determination that the first frequency does not satisfy the threshold content-stabilization frequency, forgoing moving the first content based on the motion having the first frequency;
detecting motion having a second frequency; and
in response to detecting the movement of the head of the user relative to the physical environment:
in accordance with a determination that the second frequency satisfies a threshold motion-cue frequency, adjusting the set of one or more graphical elements based on the motion having the second frequency; and
in accordance with a determination that the second frequency does not satisfy the threshold motion-cue frequency, forgoing adjusting the set of one or more graphical elements based on the motion having the second frequency.

34. The method of claim 15, wherein detecting the movement of the head of the user relative to the computer system includes detecting movement of the head of the user relative to the physical environment using a head-mounted device that is worn on the head of the user.

35. The method of claim 34, wherein detecting the movement of the head of the user relative to the computer system includes detecting movement of the head of the user relative to computer system using one or more sensors of the computer system.

36. The method of claim 15, wherein detecting the movement of the head of the user relative to the computer system includes detecting a position of the head of the user using the computer system.

37. The method of claim 36, wherein detecting the position of the head of the user using the computer system includes detecting the position of the head of the user using one or more sensors on a first side of the computer system.

38. The method of claim 36, wherein detecting the movement of the head of the user relative to the computer system includes detecting a state of the head of the user using one or more sensors of the computer system and detecting the state of the head of the user using a head-mounted device that is worn on the head of the user.

39. The method of claim 15, wherein detecting movement of the head of the user relative to the computer system includes detecting motion of the computer system relative to the physical environment via one or more sensors of the computer system.

* * * * *